(12) United States Patent
Feghali

(10) Patent No.: US 7,747,020 B2
(45) Date of Patent: Jun. 29, 2010

(54) TECHNIQUE FOR IMPLEMENTING A SECURITY ALGORITHM

(75) Inventor: Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 1056 days.

(21) Appl. No.: 10/730,203

(22) Filed: Dec. 4, 2003

(65) Prior Publication Data

US 2005/0123140 A1 Jun. 9, 2005

(51) Int. Cl.
*H04L 9/00* (2006.01)
*B41K 3/38* (2006.01)
*G11C 19/00* (2006.01)
*G11C 7/00* (2006.01)
*G11C 19/28* (2006.01)
*G06F 7/32* (2006.01)
*G06F 7/38* (2006.01)
*G06F 1/02* (2006.01)
*G06F 7/58* (2006.01)
*G06F 13/00* (2006.01)
*G06F 13/28* (2006.01)
*G06F 15/80* (2006.01)
*G06F 9/30* (2006.01)
*G06F 9/40* (2006.01)
*G09G 3/36* (2006.01)
*G06T 1/20* (2006.01)
*G06K 9/54* (2006.01)
*G06K 9/60* (2006.01)
*H03K 23/00* (2006.01)
*H03K 25/00* (2006.01)
*H03K 17/00* (2006.01)

(52) U.S. Cl. ............... 380/265; 380/59; 365/78; 365/80; 365/189.12; 365/240; 377/54; 377/57; 377/64; 708/233; 708/234; 708/252; 708/253; 708/256; 708/521; 708/524; 327/241; 327/403; 711/109; 345/100; 345/505; 345/506; 712/212; 382/303; 382/304

(58) Field of Classification Search ............... 380/265, 380/59; 365/80–90, 78, 189.12, 240; 377/64–81, 377/54, 57; 708/233, 234, 252, 253, 256, 708/406, 507, 508, 521, 524, 534, 631, 682, 708/685, 706; 327/241, 403, 473; 711/109; 345/100, 505, 506; 712/212; 382/303, 304
See application file for complete search history.

(56) References Cited

U.S. PATENT DOCUMENTS

| | | | | |
|---|---|---|---|---|
| 5,365,588 | A * | 11/1994 | Bianco et al. | 380/42 |
| 5,491,752 | A * | 2/1996 | Kaufman et al. | 380/30 |
| 5,963,646 | A * | 10/1999 | Fielder et al. | 380/259 |
| 6,134,603 | A * | 10/2000 | Jones et al. | 719/330 |
| 6,847,995 | B1 * | 1/2005 | Hubbard et al. | 709/223 |
| 7,177,421 | B2 * | 2/2007 | Buer et al. | 380/30 |
| 2002/0001384 | A1 * | 1/2002 | Buer et al. | 380/30 |

OTHER PUBLICATIONS

"On Recent Results for MD2, MD4, and MD5," M.J.B. Robshaw, RSA Laboratories, Bulletin No. 4 Nov. 12, 1996.*

* cited by examiner

*Primary Examiner*—Nasser Moazzami
*Assistant Examiner*—Oscar A Louie
(74) *Attorney, Agent, or Firm*—Thomas R. Lane

(57) ABSTRACT

Performing a hash algorithm in a processor architecture to alleviate performance bottlenecks and improve overall algorithm performance. In one embodiment of the invention, the hash algorithm is pipelined within the processor architecture.

2 Claims, 3 Drawing Sheets

TECHNIQUE FOR IMPLEMENTING A SECURITY ALGORITHM

FIELD

Embodiments of the invention relate to network security algorithms. More particularly, embodiments of the invention relate to the performance of the hash algorithms, including, for example, the secure hash algorithms ("SHA") SHA-1, SHA-128, SHA-192, and SHA-256, as well as message digest (MD) algorithms, such as the MD5 algorithm, within network processor architectures.

BACKGROUND

Security algorithms may be used to encode or decode data transmitted or received in a computer network through techniques, such as compression.

In some instances, the network processor may compress or decompress the data in order to help secure the integrity and/or privacy of the information being transmitted or received within the data. The data can be compressed or decompressed by performing a variety of different algorithms, such as hash algorithms.

One such hash algorithm is the secure hash algorithm 1 ("SHA-1") security algorithm. The SHA-1 algorithm can be a laborious and resource-consuming task for many network processors, however, as it requires numerous mathematically intensive computations within a main recursive compression loop. Moreover, the main compression loop may be performed numerous times in order to compress or decompress a particular amount of data.

In general, hash algorithms are algorithms that take a large group of data and reduce it to a smaller representation of that data. Hash algorithms may be used in such applications as security algorithms to protect data from corruption or detection. The SHA-1 algorithm, for example, may reduce groups of 64 bytes of data to 20 bytes of data. Other hash algorithms, such as the SHA-128, SHA-129, and message digest 5 (MD5) algorithms may also be used to reduce large groups of data to smaller ones. Hash algorithms, in general, can be very taxing on computer system performance as the algorithm requires intensive mathematical computations in a recursive main compression loop that is performed iteratively to compress or decompress groups of data.

Adding to the difficulty in performing the hash algorithms at high frequencies are the latencies, or "bottlenecks," that can occur between operations of the algorithm due to data dependencies between the operations. When performing the algorithm on typical processor architectures, the operations must be performed in substantially sequential fashion because typical processor architectures perform the operations of each iteration of the main compression loop on the same logic units or group of logic units. As a result, if dependencies exist between the iterations of the main loop, a bottleneck forms while unexecuted iterations are delayed to allow the hardware to finish processing the earlier operations.

These bottlenecks can be somewhat abrogated by taking advantage of instruction-level parallelism ("ILP") of instructions within the algorithm and performing them in parallel execution units.

Typical prior art parallel execution unit architectures used to perform hash algorithms have had marginal success. This is true, in part, because the instruction and sub-instruction operations associated with typical hash algorithms rarely have the necessary ILP to allow true independent parallel execution. Furthermore, earlier architectures do not typically schedule operations in such a way as to minimize the critical path associated with long dependency chains among various operations.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention described herein relate to network security algorithms. More particularly, embodiments of the invention described herein relate to a technique that may be used to improve the performance of the hash algorithms without incurring significant cost.

At least one embodiment of the invention may be used to improve the performance of hash algorithms by performing various operations associated with the algorithm concurrently, or "pipelining" the operations, within a microprocessor. Pipelining the SHA-1 algorithm, for example involves performing various iterations of the main compression loop at different stages of a microprocessor concurrently in one embodiment of the invention. The extent to which iterative operations of the algorithm may be performed depends, at least in part, on the instruction level parallelism (ILP) of the microprocessor in which the algorithm is executed.

Figure 1:
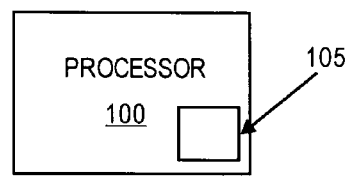
FIG. 1 illustrates a processor architecture in which one embodiment of the invention may be used.

FIG. 1 illustrates a processor architecture in which one embodiment of the invention may be used to perform a hash algorithm while reducing performance degradation, or "bottlenecks," within the processor. In the embodiment of the invention illustrated in FIG. 1, the pipeline architecture of the encryption portion 105 of the network processor 100 may operate at frequencies at or near the operating frequency of the network processor itself or, alternatively, at an operating frequency equal to that of one or more logic circuits within the network processor.

Figure 2:
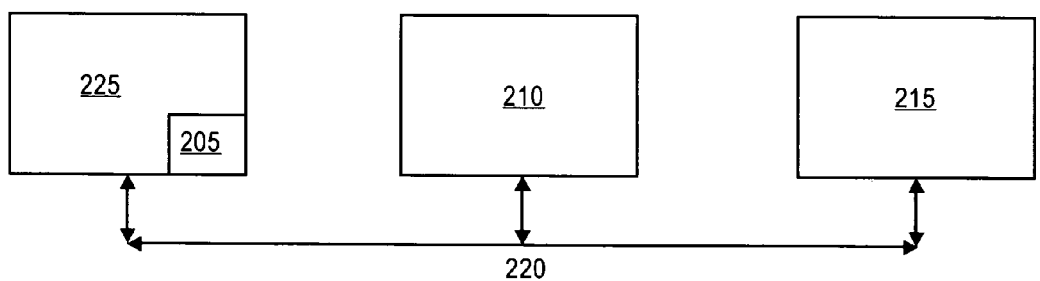
FIG. 2 illustrates a system in which one embodiment of the invention may be used.

FIG. 2 illustrates a computer network in which an embodiment of the invention may be used. The host computer 225 may communicate with a client computer 210 or another host computer 215 by driving or receiving data upon the bus 220. The data is received and transmitted across a network by a program running on a network processor embedded within the network computers. At least one embodiment of the invention 205 may be implemented within the host computer in order to compress that data that is sent to the client computer(s).

For example, in one embodiment of the invention, a hash algorithm operates on blocks of 512 bits of data at time. In such an embodiment, algorithm compression loop receives a 160-bit state input along with 512 bits of data and produces a 160-bit state output by producing an intermediate state output that is a function of the state input and data input and adds this to the state input in order to produce the 160-bit final state output.

Various processor architectures having various operating frequencies may be used to facilitate the expedient compression or decompression of the data using a hash algorithm. In one embodiment of the invention, hash algorithms, such as the SHA-1, SHA-128, SHA-192, SHA-256, and the message digest 5 (MD5) algorithms, are performed on pipelined processor architectures operating at frequencies up to, and in excess of, 1.4 GHz.

For at least one embodiment of the invention, the SHA-1 algorithm can be performed with fewer performance bottlenecks and at greater operating frequencies by taking advantage of the recursive nature of the inner loop of the algorithm, which performs multiple iterations of the equation:

$$TEMP = R^5(A) + F_t(B,C,D) + E + X_t + K_t$$

Where:
E=D;
D=C;
$C = R^{30}(B)$;
B=A;
A=TEMP;

A, B, C, D are chaining variables that changes state with each iteration of the loop, such that the function $F_t$ produces a new result for each iteration. The function $F_t$ represents a mathematical operation or operations that performs the SHA-1 algorithm. The function $R^x(v)$ is a left rotation function of x bits by a number of bit positions, v. The rotation function may be implemented using various logic devices, including a shifter. The equation is executed t number of times in order to process $X_t$ units of data Furthermore, the constant, K, may change periodically.

For example, in one embodiment of the invention, the loop executes 80 times to process 512 bits of data, and the constant, K, changes every 20 iterations of the loop.

The inner compression loop that executes the above equation may be performed much faster by performing the loop in a pipelined processor architecture, wherein each iteration of the loop is performed by a dedicated pipeline stage or stages. For example, FIG. 3 illustrates some of the pipeline stages and operations that are performed to execute the above equation 80 times in order to process 512 bits of data.

In pipeline stage 1 305, the constant, K, is added to the first data word 301, $X_1$, and the chaining variables, B, C, D, and E, are set to their initial state 302. In pipeline stage 2 310, the result of stage 1 is added to the chaining variable $E_0$ 306, chaining variables, B, C, and D, are applied to the function, F 307, and the constant, K, is added to the data word, $X_2$ 308. In pipeline stage 3 320, the result of the function F is added 311 to the sum of E and the result from stage 1, the constant, K, is added to the data word $X_3$ 313, the stage 2 result is added to the chaining variable D 314, and the function is applied to chaining variables A, B, and C 315 after they have been rotated to the left by 30 bits.

Figure 3:
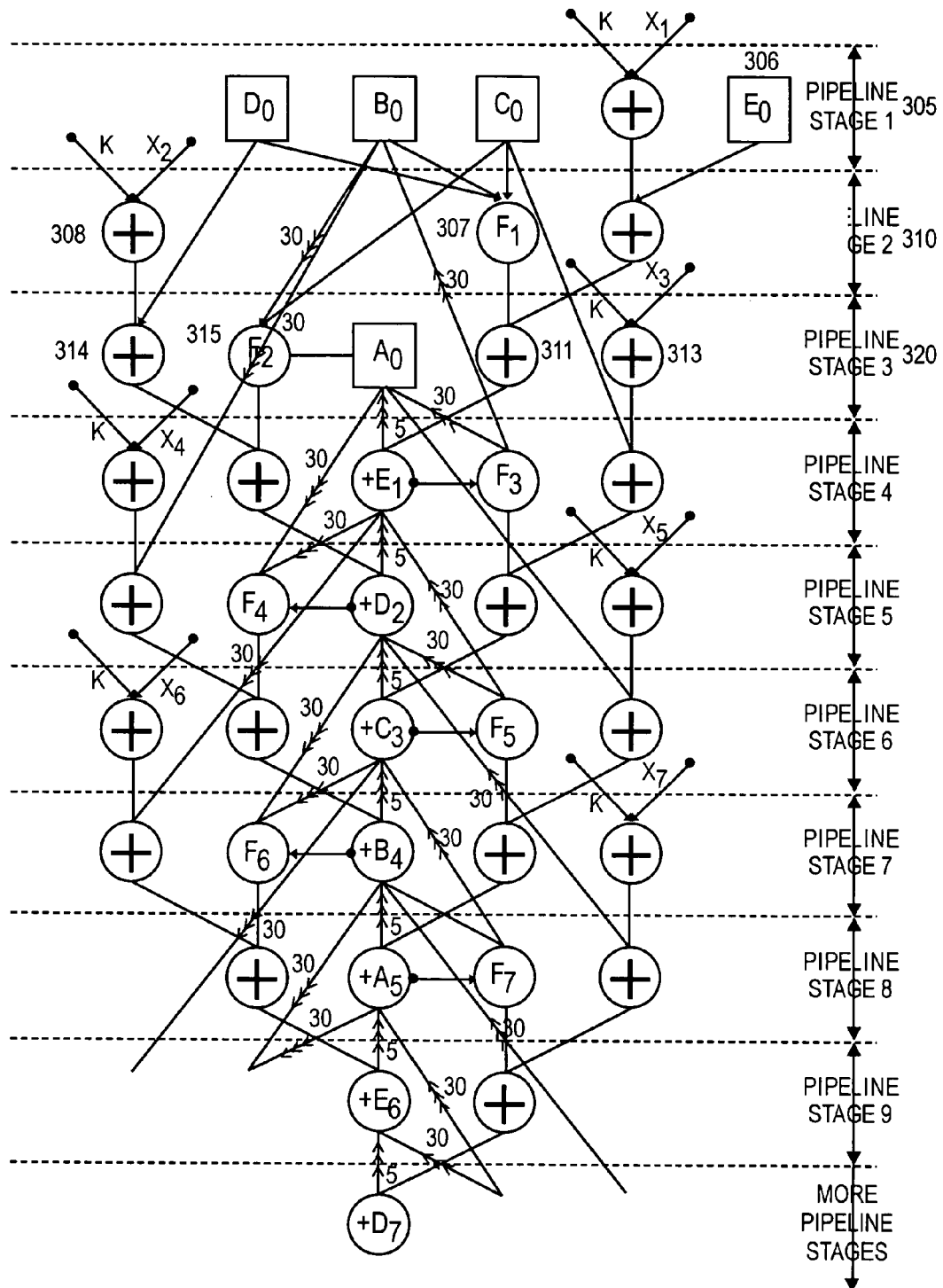
FIG. 3 illustrates an technique for performing a hash algorithm in a pipelined architecture according to one embodiment of the invention.

Because the inner loop is executed 80 times in order to process 512 bits, the pipeline architecture illustrated in FIG. 3 may require 83 stages to perform the all 80 iterations of the equation. Furthermore, the SHA-1 algorithm may require that the initial states of the chaining variables be added to the final states of the chaining variables, which requires an extra 5 pipeline stages, for a total of 88 pipeline stages to completely process the 512 bits of data.

In other embodiments, fewer pipeline stages may be used to process the 512 bits by performing several operations at each pipeline stage. Furthermore, fewer or more pipeline stages may be used in other embodiments of the invention depending upon the hash algorithm to be performed. The determination of what pipeline stages perform which operations associated with each iteration of the equation is largely determined by scheduling logic that attempts to schedule these operations according to their data dependencies. In this manner, the scheduler can use the pipeline stages in the most efficient manner possible, thereby preventing lengthy bottlenecks.

For example, if an operation performed in iteration 2 of the inner loop is dependent upon data from an operation performed in iteration 1, the second pipeline may remain partially idle for a time until the data from iteration 1 (performed in the first pipeline stage) is available. However, if these operations are performed in parallel with operations having similar data dependencies and therefore similar delay, the scheduler can perform these operations at one time at different pipeline stages. As a result, bottlenecks and delays incurred by data dependencies are minimized, allowing the pipeline architecture to operate at higher frequencies limited only by the operating frequency of the processor architecture or hardware therein, such as the adder circuits.

Figure 4:
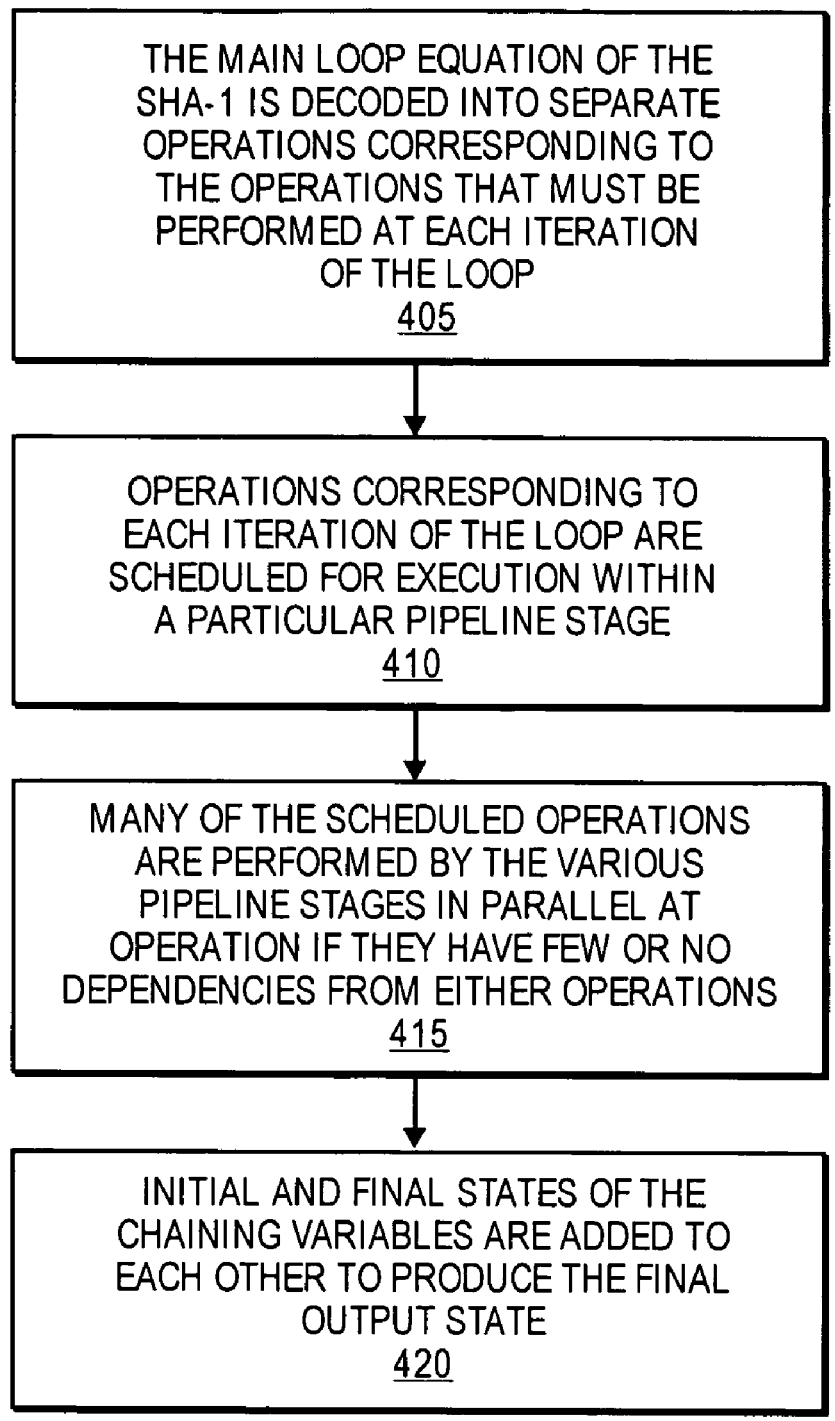
FIG. 4 illustrates a method for performing a hash algorithm according to one embodiment of the invention.

FIG. 4 illustrates a method for carrying out the invention according to one embodiment. The main loop equation of the SHA-1 must be decoded into separate operations corresponding to the operations that must be performed at each iteration of the loop at operation 405. Operations corresponding to each iteration of the loop may then be scheduled for execution within a particular pipeline stage at operation 410.

The choice of which stage in which to perform the operation(s) depends, at least in part, on the dependencies between the operations. In order to perform the algorithm at the highest performance level possible, the critical paths (operations having lengthy dependency chains) must be found and scheduled in such a manner so as to impose a minimum amount of delay on the performance of other operations and the algorithm in general.

Many of the scheduled operations may then be performed by the various pipeline stages in parallel at operation 415 if they have few or no dependencies from earlier operations.

In addition to performing the operations corresponding to each iteration of the main compression loop, the initial and final states of the chaining variables must be added to each other in order to produce the final output state at operation 420.

Embodiments of the invention may be performed using logic consisting of standard complementary metal-oxide-semiconductor ("CMOS") devices (hardware) or by using instructions (software) stored upon a machine-readable medium, which when executed by a machine, such as a processor, cause the machine to perform a method to carry out the steps of an embodiment of the invention. Alternatively, a combination of hardware and software may be used to carry out embodiments of the invention.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A processor comprising;
    a plurality of pipeline stages to perform an inner loop of a hash algorithm, the plurality of pipeline stages comprising at least as many pipeline stages as there are iterations of the inner loop to be performed and as many pipeline stages as there are chaining variables to be used in the inner loop, wherein each iteration of the inner loop is performed by a dedicated pipeline stage, each pipeline stage comprises an adder, a shifter, and logic to perform function, and the plurality of pipeline stages comprises 88 pipeline stages to process 512 bits of data, and control logic to schedule operations to be executed within the plurality of pipeline stages, wherein operations are to be scheduled by the control logic and executed by the plurality of pipeline stages so as to minimize data dependencies between iterations of the inner loop to be performed, wherein the hash algorithm is chosen from a group of secure hash algorithms (SHA) consisting of SHA-1, SHA-128, SHA-196, SHA-256, and message digest 5 (MD5), and is to be performed at an operating frequency equal to that of the adder.

2. A machine-readable medium having stored thereon a set of instructions, which if executed by a machine cause the machine to perform a method comprising:

performing a plurality of iterations of an inner loop of an hash algorithm in parallel, the plurality of iterations performed in parallel being limited, at least in part, by dependencies between each of the plurality of iterations of the inner loop;

adding initial values of a plurality of chaining variables to final values of the plurality of chaining variables, the final values being a result of performing the plurality of iterations of the inner loop;

controlling scheduling of operations performed as a result of performing the plurality of iterations of the inner loop, the scheduling being controlled so as to minimize a critical path among the operations, wherein the critical path depends upon the dependencies between the plurality of iterations of the inner loop;

decoding the inner loop of the hash algorithm into a first number of operational stages, the first number of operational stages being equal to at least the plurality of iterations, wherein the inner loop is to be performed to process a first number of data elements transmitted over a network, and the first number of operational stages is at least 83 and the first number of data elements comprises 512 bits.

* * * * *